US006534623B1

(12) United States Patent
Gochanour

(10) Patent No.: US 6,534,623 B1
(45) Date of Patent: Mar. 18, 2003

(54) PROCESS FOR THE PREPARATION OF CRYSTALLINE POLYCARBONATE OLIGOMERS

(75) Inventor: Craig Robert Gochanour, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/912,482

(22) Filed: Jul. 25, 2001

(51) Int. Cl.[7] .................................................. C08G 64/00
(52) U.S. Cl. ....................................... 528/196; 528/198
(58) Field of Search ................................... 528/196, 198

(56) References Cited

U.S. PATENT DOCUMENTS

| 5,191,001 A | 3/1993 | Kühlig et al. |
| 5,214,073 A | 5/1993 | Fukawa et al. |
| 5,717,056 A | 2/1998 | Satyanarayana et al. |

FOREIGN PATENT DOCUMENTS

| EP | 0848030 A1 | 6/1998 |
| EP | 0864597 A1 | 9/1998 |
| JP | 178979 A | 7/1993 |

*Primary Examiner*—Terressa M. Boykin

(57) ABSTRACT

Disclosed is a process for the preparation of crystalline polycarbonate oligomer compositions from amorphous polycarbonate oligomer compositions in the presence of a fugitive crystallization rate enhancing agent and/or a high melting polymeric nucleating agent.

13 Claims, No Drawings

PROCESS FOR THE PREPARATION OF CRYSTALLINE POLYCARBONATE OLIGOMERS

FIELD OF THE INVENTION

This invention concerns a process for the preparation of semicrystalline polycarbonate oligomer compositions from amorphous polycarbonate oligomer compositions in the presence of i) a fugitive plasticizer which acts as a temporary crystallization-rate enhancing agent and/or ii) a particulate nucleating agent. The semicrystalline compositions produced are useful as starting materials for the production of high molecular weight polycarbonate by solid state polymerization.

TECHNICAL BACKGROUND OF THE INVENTION

High molecular weight polycarbonate is a valuable engineering resin useful for producing many objects, especially clear sheeting, compact recording discs and housings for electronic equipment. There are a number of ways this resin can be produced. The most common industrial method is the interfacial polymerization method in which bisphenol-A and phosgene are reacted in a heterogeneous mixture of water and methylene chloride. Although this process produces the desired high molecular weight polymer, there are disadvantages associated with it. Phosgene is extremely toxic and hence results in safety concerns. In addition the use of methylene chloride raises environmental concerns. Finally, the polymer produced by this method contains residues of sodium chloride which are produced by neutralization of sodium hydroxide used to dissolve bisphenol-A in water. This impurity is undesirable in some applications and is difficult to remove. A second method used to produce polycarbonate is the melt polymerization of bisphenol-A and diphenyl carbonate. This process requires the removal of the condensation by-product from the viscous polymer melt. The high temperatures required to achieve low viscosity can lead to degradation of the polycarbonate polymer. A final method known for producing polycarbonate is solid state polymerization. This type of polymerization is widely practiced for the production of polyethylene terephthalate resin for containers. In this process a low or moderate molecular weight polymer is produced and isolated as a solid material such as chips, particles, granules, or powders. Particles of controlled size and shape are most desirable. The polymerization of this solid material is accomplished by heating it to a temperature below its melting temperature with a heated inert gas. The solid state polymerization is thus carried out at lower temperature, which reduces the degradation problem. Before this final step of the solid state polymerization is carried out, the starting materials must be crystallized. For polycarbonate this step is known to be very difficult because of the slow crystallization rate of polycarbonate. Although technologies for crystallization of polycarbonate have been described, all of these technologies have serious drawbacks associated with them.

European Patent No. 0 864 597 discloses a process for the solid state polymerization of polycarbonate oligomer under an atmosphere of a swelling solvent gas or under a stream of a poor solvent gas. The process is applied to either amorphous oligomer particles or powders or to semicrystalline particles or powders. The process does not include a separate crystallization step and hence does not allow one to control the conditions under which crystallization occurs. The swelling solvent gas or poor solvent gas is present throughout the process along with a second inert gas. Since this mixed gas stream will also contain condensation by-products that must be removed during the solid state polymerization, the required constant presence of swelling or poor solvent gas complicates the gas handling requirements of this process, especially if the gas is recycled. Suitable swelling solvents listed include aromatic hydrocarbons, e.g. benzene and substituted benzenes; ethers, e.g. tetrahydrofuran and dioxane; and ketones, e.g. methyl ethyl ketone. Suitable poor solvent gases listed include cyclic hydrocarbons, straight chain or branched saturated hydrocarbons, and unsaturated hydrocarbons.

U.S. Pat. No. 5,191,001 discloses a process for the production of polycarbonate by solid state polymerization of an intimate mixture of oligomeric polycarbonates. The oligomers to be used in this process have a particular endgroup composition. Although crystallization is a required step for this process, the authors do not disclose any particular crystallization technology. A number of general schemes of possible applicability to many polymers are included. The only crystallization method applied is the well-known solution procedure where a semicrystalline powder is prepared by solvent removal from a solution of the oligomers in methylene chloride.

U.S. Pat. No. 5,717,056 discloses a method for preparing a polycarbonate comprising the steps of (a) converting a precursor polycarbonate to an enhanced crystallinity precursor polycarbonate, and (b) polymerizing in the solid state. Converting the precursor polycarbonate to an enhanced crystallinity precursor polycarbonate entails contact at above 110° C. with a basic compound. Specific basic compounds listed include alkali metal hydroxides, tetraalkylammonium hydroxides, tetraalkylammonium carboxylates, tetraalkylphosphonium hydroxides, and tetraalkylphosphonium hydroxides. The preferred basic compounds are tetramethylammonium maleate and tetraethylammonium hydroxide. The procedure described to produce this enhanced crystallinity precursor polycarbonate involves contact of polycarbonate particles with a solution containing this basic compound followed by a thermal treatment.

European Patent No. 0 848 030 discloses a process for crystallizing a polycarbonate prepolymer comprising dissolving it in a solvent at elevated temperatures, then cooling the solution to effect crystallization. Preferred solvents are aromatic compounds which form solutions of a concentration of 20–90% polycarbonate. The crystalline product produced is then shaped into the form desired for solid state polymerization. This shape is then dried to volatilize the solvent. This process requires many steps to produce the desired crystallized product.

Japanese Patent Heisei 93 178979 discloses a process for the manufacture of aromatic polycarbonate by solid phase polymerizing crystalline polycarbonate prepolymer characterized in that intermediate polymer that has been solid phased is treated with a crystallization solvent and then subjected again to solid phase polymerization.

It is well known that polycarbonate can be crystallized by exposure to solvents such as acetone. U.S. Pat. No. 5,214,073 discloses a method for preparing a porous crystallized polycarbonate oligomer or prepolymer. In one process described an amorphous polycarbonate oligomer is slurried with acetone to produce the crystallized polycarbonate oligomer. The large amorphous particles that are charged to the acetone bath break up into a very fine powder during the crystallization process. A second process described consists of the melt extrusion of the prepolymer melt into a stirred volume of acetone. This also produces a very fine crystalized powder. Both powders are dried before being subjected to the solid state polymerization. A very fine powder is often not desirable in solid state polymerization because of difficulties associated with material handling.

SUMMARY OF THE INVENTION

Provided herein is an improved method for crystallization of polycarbonate or polycarbonate production by solid state polymerization.

This invention provides a process for the preparation of crystalline polycarbonate oligomer compositions from amorphous polycarbonate oligomer compositions comprising the steps of a) preparing a mixture of the amorphous polycarbonate oligomer with:
   i) a fugitive crystallization enhancing agent, and/or
   ii) a high melting particulate polymeric nucleating agent
b) forming this mixture into a shape desired, and
c) crystallizing this mixture at a temperature above its glass transition temperature.

Step a) of the above process can be carried out by first producing the oligomeric polycarbonate by contacting a bisphenol with a diaryl carbonate in the melt, in the presence of a suitable catalyst, and then mixing that oligomer with i) a fugitive crystallization enhancing agent, and/or ii) a high melting particulate polymeric nucleating agent. Another method for first producing the oligomeric polycarbonate is by interfacial polymerization of a dihydroxyaromatic compound in the presence of phosgene in solution in the presence of an acid acceptor and an amine as a catalyst. If the fugitive crystallization enhancing agent is used, it can also be mixed with the monomers before oligomerization by either method.

DETAILED DESCRIPTION OF THE INVENTION

The invention is a method for the crystallization of polycarbonate oligomers which are used in the production of high molecular weight resin by solid state polymerization.

The difficulties in crystallizing polycarbonate prior to solid state polymerization are related to the slow development of crystallinity in this polymer.

The time required to obtain the maximum level of crystallinity in polycarbonate is much longer than for other polymers. The crystallization rate found for polycarbonate oligomer is greater than that of high molecular weight polycarbonate but it is still very low compared to other polymers, such as polyethylene terephthalate, of similar molecular weight, i.e., it exhibits much longer crystallization times. Two factors are the source of the low crystallization rate of polycarbonate. One is related to chain mobility and the high Tg of polycarbonate. Upon cooling from melt, the crystallization rate of polycarbonate increases with decreasing temperature as the driving force for crystal formation, or supercooling, increases. The increase in supercooling is however counteracted by a decrease in mobility as Tg is approached. This understanding leads one to suppose that crystallization rate could be increased by adding a plasticizer that lowers Tg without greatly affecting Tm. This strategy is not desirable since the high Tg of polycarbonate is a very desirable product attribute. This problem is solved by the incorporation of a fugitive crystallization agent. The fugitive crystallization agent is present during operations where it is required, i.e., particle formation and crystallization, but is chosen so that it is sufficiently volatile that it can be removed during solid state polymerization.

The fugitive crystallization agent used in the process of the present invention is described as "moderately volatile" or fugitive in that it can be essentially completely removed during subsequent solid state polymerization of the crystallized oligomer particle by volatilization. Thus, it must have a sufficiently high vapor pressure under solid state polymerization conditions. Crystallization agents with an excessively high vapor pressure are not desirable since they rapidly escape during particle formation from the melt. This leads to problems such as bubble formation, foaming, and contamination of the working environment by the volatile component. The moderately volatile, fugitive crystallization agents usable in the present invention are characterized by a molecular weight greater than 150 g/mole and less than about 600 g/mole. Examples are known plasticizers such as alkyl esters of fatty acids, phthalates, mellitates and materials meeting the above-stated requirements but not normally thought of as plasticizers such as benzophenone and biphenyl. The fugitive crystallization agent is normally present in a concentration of about 5% to about 30% by weight.

The second factor limiting crystallization rate is nucleation. It is generally known that the rate of growth of crystallization can be accelerated in polymers by the addition of a nucleating agent. Examples of commonly used nucleating agents include inorganic oxide materials such as talc, or organic salts such as sodium benzoate. These materials suffer from a common weakness in that they require the addition of a foreign substance, essentially an impurity, to the polycarbonate resin to be produced. In many applications this adversely affects the end use properties of the resin.

Disclosed herein is a process for nucleating the polycarbonate oligomer by the addition of a nucleating agent which is prepared from polycarbonate or other condensation polymer. This invention provides a nucleating agent that is effective in increasing the rate of crystallization but is not a foreign substance since it will ester interchange with the polycarbonate when the polymer is melted after solid state polymerization. An example of such a nucleation agent is a high melting semicrystalline polycarbonate. This material is prepared by extended annealing at high temperature and thus is easily obtained from the product of a solid state polymerization process. This material is either formed into a powder and then annealed or annealed in particle form and then ground to a fine powder, which is used as the nucleating agent.

The method comprises the steps of first forming the appropriate mixture of polycarbonate oligomer with the desired additives. If a fugitive crystallization agent is used, the combination of oligomer plus fugitive crystallization agent may be formed in a number of ways. It is possible to combine oligomer with the fugitive crystallization agent prior to particle formation; e.g., the fugitive crystallization agent is mixed with the oligomer preferably in the melt state or perhaps as a solid prior to particle formation. It is possible to avoid the mixing process by performing the oligomerization in the presence of the fugitive crystallization agent. The fine powder nucleating agent is added to oligomer melt or to a melt consisting of the oligomer and the fugitive crystallization agent. This mixture can then be formed into particles that will have an enhanced crystallization rate. After a mixture of amorphous polycarbonate with either a crystallization enhancing agent and/or a high melting particulate polymeric nucleating agent is prepared it can be formed into a desired shape in several ways. Particle formation can be carried out through a number of processes such as prilling, pastillization and strand cutting. The particle formation and crystallization processes can be carried out as separate steps, for example by quenching the formed particle to an amorphous glassy state and subsequently reheating above the glass transition temperature of the mixture to crystallize, although it is preferred to do these procedures as a single step. This single step process can be done, for example, by using a heated turntable or using a Rotoformer® pastillator with a heated belt, as disclosed in U.S. Pat. No. 5,633,018. In this technology, a melt or plasticized melt is formed into particles which are held at an appropriate temperature for crystallization, thus combining crystallization and particle formation into a single step. Crystallization occurs at a temperature below the melting temperature and above the Tg of the mixture, generally close to the temperature of maximum crystallization rate. The semicrystalline particles formed can then be solid state polymerized. For example, the particles are heated at 180° C. to 250° C. under a flow of inert gas or under vacuum to increase molecular weight. The fugitive crystallization agent is chosen so that it can be essentially completely removed during the subsequent solid state polymerization step. The fugitive crystallization agent is initially present during solid state polymerization and may have a second beneficial effect of increasing solid state polymerization rate. Diffusion of the fugitive crystallization agent and volatilization result in a high molecular weight material free of the fugitive crystallization agent and hence having the required high Tg of polycarbonate.

The efficacy of a particular additive can be judged in a number of ways. The rate of crystallization of the polycarbonate oligomer can be characterized by monitoring the change in particle properties when the particle is subjected to the desired crystallization conditions. It is also convenient to characterize the crystallization using standard laboratory tests. DSC, differential scanning calorimetry, is used to determine crystallization rates and crystallization temperatures. This is a widely available technique whose use is well known in the crystallization field. The crystallization temperature is measured by cooling, or heating, at a fixed rate. Heating was done at a rate of about 20° C./min and cooling at a rate of about 10° C./min. When crystallization occurs, an exothermic peak is detected at some temperature. For materials with very slow crystallization rates no peak is observed on cooling. As the crystallization rate is increased, a peak will appear. The position of this peak is a measure of crystallization rate. On cooling the peak will appear at higher temperature, i.e., with less supercooling, for materials with increased crystallization rate. A similar experiment can be conducted with a material that is first quenched to the glassy state. Upon heating, a crystallization peak occurs and the temperature at which this peak occurs will increase as the crystallization rate is increased.

The molecular weight of polycarbonate oligomers has been measured using the intrinsic viscosity measured by Forced Flow Viscometry using a Viscotek Forced Flow Viscometer Model Y-900. The solvent system used was methylene chloride. For samples with high crystallinity we found that it was necessary to use 50/50 wt % trifluoroacetic acid/methylene chloride. The intrinsic viscosity measured in this mixed solvent can be translated to an intrinsic viscosity measured in methylene chloride by use of a correlation between the intrinsic viscosities in the two solvent systems developed using polycarbonates that are soluble in both systems.

EXAMPLES

Preparation of Polycarbonate Oligomers

The polycarbonate oligomers used were prepared by melt polymerization of diphenyl carbonate and bisphenol A in a stirred vacuum autoclave. Phenol was removed as the condensate from the polymerization. The molecular weight achieved was controlled by the time, temperature, and vacuum obtained. For example, the reactor was charged with 4.39 moles bisphenol A and 4.81 moles diphenyl carbonate along with an aqueous solution containing 0.08 grams boric acid, 0.12 grams tetramethyl ammonium hydroxide, and 0.1 grams sodium bicarbonate. A polycarbonate of intrinsic viscosity 0.135 dl/g was obtained from a melt polymerization which was held at a maximum temperature of 240° C. and a vacuum of 15 mm Hg for 30 min.

Comparative Ex #1

Crystallization of Polycarbonate Oligomer

Amorphous particles of a polycarbonate oligomer of intrinsic viscosity 0.149 dl/g were formed by slowly dripping oligomer melt onto a turntable surface which is cooled with water to maintain a temperature near room temperature. The particles were optically clear, consistent with an amorphous structure. A DSC trace of this sample showed a clear glass transition at 109° C. There was no crystallization exotherm present on heating and no melting transition was observed ($\Delta H_f$<0.1 J/g). No crystallization peak was observed upon cooling from the melt. Thus this sample did not crystallize on the time scale of the DSC measurement.

A group of the amorphous particles were placed into a vacuum oven that was preheated to 165° C. After 5 min at this temperature the appearance of the particles changed. They became slightly translucent indicating that crystallization had begun. The appearance of the particles continued to change with an increase in translucency with increasing time. After 30 min. it was determined that the appearance of the particles was no longer changing and the particles were removed from the oven. A DSC thermogram of these particles showed no crystallization peak on heating but there was a large crystal melting transition with peak melting temperature of 217° C. and a heat of fusion of 31.1 J/g indicating that crystallization had occurred over the 30 min time period at 165° C.

Examples #1–11

Crystallization of Polycarbonate Oligomer/Fugitive Crystallization Agent Mixtures Two samples of polycarbonate oligomer having intrinsic viscosities of 0.135 dl/g and 0.151 dl/g were prepared by melt polymerization. These samples were combined to produce a larger batch. The resulting oligomer was mixed with a series of fugitive crystallization agents. The description of these fugitive crystallization agents and their physical properties are given in Table 1. The composition of the mixtures prepared is given in Table 2.

TABLE 1

| Fugitive Crystallization Agent | Abbreviation | Molecular Weight (g/mole) | Literature Boiling Temperature (° C.) |
|---|---|---|---|
| benzophenone | BZP | 182 | 306 |
| biphenyl | BP | 154 | 255 |
| tri-(n-octyl,n-decyl) trimellitate | TODTM | 547 | 414 |

TABLE 1-continued

| Fugitive Crystallization Agent | Abbreviation | Molecular Weight (g/mole) | Literature Boiling Temperature (° C.) |
|---|---|---|---|
| tritolyl phosphate | TTP | 368 | 410* |
| n-butyl stearate | NBS | 341 | 223** |

*mixture of three isomers. boiling temperature of tri-o-cresol phosphate is 410° C.
**reduced pressure of 15 mm Hg

TABLE 2

| Example # | Fugitive Cryst. Agent | Weight % Cryst. Agent |
|---|---|---|
| 1 | BZP | 20.0 |
| 2 | BP | 20.3 |
| 3 | TODTM | 20.6 |
| 4 | TTP | 19.8 |
| 5 | BZP | 30.1 |
| 6 | BP | 29.6 |
| 7 | TODTM | 30.3 |
| 8 | TTP | 30.0 |
| 9 | NBS | 20.9 |
| 10 | NBS | 20.9 |
| 11 | TODTM | 10.0 |

Approximately 1 gram of the oligomer/fugitive crystallization agent mixture was placed in a vial which was flushed with nitrogen. The mixture was then heated under nitrogen in an oven at 250° C. for 5 min. Following this heating period, the mixture was removed from the oven and mixed well. The cooling rate following the preparation of the sample was not controlled. A DSC thermogram was recorded for each sample to determine the effect on crystallization temperature (Tc), glass transition temperature (Tg), and melting temperature (Tm). The results of this analysis are given in Table 3.

TABLE 3

| Example # | Tg (° C.) (1st heat) | $T^1_c$ (° C.), $\Delta H^1_c$ (J/g) (1st heat) | $T^1_m$ (° C.) $\Delta H^1_m$ (J/g) (1st heat) | $T^2_c$ (° C.), $\Delta H^2_c$ (J/g) (1st cool) | $T^2_m$ (° C.) $\Delta H^2_m$ (J/g) (2nd heat) |
|---|---|---|---|---|---|
| #1 (BZP/20) | 34.8 | 123.7, 19.8 | 194.8, 14.6 | 121.7, 18.2 | 197.5, 14.8 |
| #2 (BP/20) | 31.9 | 105.8, 18.2 | 194.0, 15.0 | 132.4, 18.6 | 201.2, 12.4 |
| #3 (TODTM/20) | 43.4 | 150.6, 18.2 | 214.5, 15.4 | 142.1, 21.4 | 215.6, 25.9 |
| #4 (TTP/20) | 43.9 | 156.3, 10.4 | 207.7, 9.7 | 120.3, 18.9 | 208.4, 20.8 |
| #5 (BZP/30) | 16.6 | 103.7, 15.7 | 183.8, 11.4 | 111.9, 14.0 | 185, 12.9 |
| #6 (BP/30) | 10.8 | 74.6, 22.1 | 182.7, 13.6 | 122.8, 11.9 | 183.1, 12.1 |
| #7 (TODTM/30) | 43.6 | 153.7, 18 | 216.2, 17.8 | 145.3, 20.3 | 215, 20.8 |
| #8 (TTP/30) | 26.9 | 133, 6.7 | 203.8, 13.5 | 123.9, 16.8 | 203.3, 16.9 |
| #9 (NBS/10) | 57.6 | 160.4, 18.7 | 215.6, 18.5 | 132.5, 24.7 | 215.0, 25.8 |
| #10 (NBS/21) | 55.7* | 162.0, 14.8 | 216.2, 15.4 | 145.8, 23.3 | 215.9, 25.0 |
| #11 (TODTM/10) | 68.0 | 171.2, 9.3 | 215.4, 7.7 | 167.1, 6.3 | 215, 10.5 |

*crystallization of NBS occurs on cooling below room temperature in the DSC experiment. This does not affect the ability of NBS to function as an effective plasticizer but does yield a Tg which appears higher than expected.

For Examples 1–11 the glass transition temperature was depressed from the value of 105° C. which is found for the oligomer without additives. In addition the melting point was depressed to a much smaller extent. The desired increase in crystallization rate was found for each sample, since in each case we saw a crystallization peak both on cooling and heating indicating that crystallization was sufficiently rapid to occur during the heating and cooling cycles. An exception occurred for Example 11 where the increase in crystallization rate resulted in an observable crystallization peak on heating but none during cooling. Thus it had the smallest crystallization rate of these examples. In contrast the unmodified polymer did not show a crystallization peak on heating or cooling, indicating it had a smaller crystallization rate than Examples 1–11.

Example 12
Preparation of Polycarbonate Nucleating Agent

Amorphous polycarbonate particles were prepared as described in comparative Example 1. The intrinsic viscosity of the oligomer used to prepare these particles was 0.141 dl/g. The particles were crystallized in a vacuum oven at 165° C. for 37 min. These samples were then solid state polymerized in a 2 inch diameter glass solid state polymerization device. The sample was heated with a flowing stream of nitrogen gas. The particles were heated with a nitrogen flow of 50 min. The temperature of the particles was measured using a thermocouple positioned within the particle bed. The temperature was held at 190° C. for 1 hour followed by 24 hours at 200° C. A DSC of this sample showed an elevated melting temperature of 264° C. The heat of fusion was 62 J/g.

A portion of this sample was ground using a Spex CertiPrep® 6750 Freezer/Mill in which the sample is immersed in liquid nitrogen during the grinding process. The sample was ground for at least four two minute cycles. The finest particles were segregated by sieving through a 400 mesh screen.

Example 13

A mixture was prepared consisting of 0.5% by wt of the polycarbonate nucleating agent described in Example 12, 10% n-butyl stearate, and the remainder polycarbonate oligomer of intrinsic viscosity 0.124 dl/g. This mixture was heated in an air oven at 245° C. The ingredients were well mixed by repeated stirring and then slowly poured into a room temperature aluminum pan to form particles of about 25 mg mass. A DSC thermogram was recorded for this material under the same conditions used for Examples 1–11. The maximum temperature of the DSC program was 245° C. The glass transition temperature on the first heat was found to be 45° C. A crystallization exotherm with a magnitude of 25.2 J/g occurred at 127.4° C. This was followed by a melting transition of magnitude 22.8 J/g with peak melting temperature of 209.4° C. Upon cooling at 10° C./min, the sample crystallized at 163.4° C. with a heat of crystallization of 22.7 J/g. The second heating showed a glass transition at 60° C. and a melting transition at 210.5° C. with an enthalpy of 24.5 J/g. The crystallization temperature on cooling was substantially higher than those recorded for samples consisting only of polycarbonate oligomer and n-butyl stearate.

obtained for each sample. The maximum temperature in the DSC program was 245° C. The results obtained are shown in Table 4.

TABLE 4

| Example # | Tg (° C.) (1st heat) | $T^1_c$ (° C.), $\Delta H^1_c$ (J/g) (1st heat) | $T^1_m$ (° C.) $\Delta H^1_m$ (J/g) (1st heat) | $T^2_c$ (° C.), $\Delta H^2_c$ (J/g) (1st cool) | $T^2_m$ (° C.) $\Delta H^2_m$ (J/g) (2nd heat) |
|---|---|---|---|---|---|
| #15 (0.14 dl/g) | 59.8 | 134.8, 26 | 217.3, 24.8 | 168.7, 28.0 | 217.3, 30.2 |
| #16 (0.144 dl/g) | 71.8 | 152.4, 20.5 | 219.1, 19.8 | 170.7, 27.9 | 219.7, 28.2 |
| #17 (0.2 dl/g) | 71.5 | 158.3, 25.2 | 222, 25.2 | 171.4, 27.3 | 220.7, 26.9 |

Comparative Example 14

The mixture of polycarbonate oligomers described in Examples 1–11 was used to prepare a mixture consisting of 2% talc, 10% n-butyl stearate and the remainder polycarbonate oligomer. Talc is a well known nucleating agent used in polyesters and other polymers. The sample was prepared in a manner analogous to that described for Example 13. The DSC thermogram for this sample had a first heat Tg of 59° C. and a first heat crystallization temperature of 140.4° C. with a heat flow of 27.1 J/g. The first heat melting occurred at 214.8° C. with an enthalpy of 21.6 J/g. On cooling crystallization occurred at 164.3° C. with a heat flow of 21.5 J/g. The second heat Tg occurred at 46° C. and melting occurred at 215° C. with an enthalpy of 22.2 J/g. The effect of 2% talc was very similar to that of 0.5% polycarbonate nucleating agent. The polycarbonate nucleating agent has the advantages that a much smaller amount of material was required and a foreign material was not added to the polycarbonate matrix since the nucleating agent was chemically identical to the material in which it was dispersed.

Examples #15–#17

Three samples were prepared using polycarbonate oligomer of varying molecular weight. For Example 15 an oligomer with intrinsic viscosity 0.14 dl/g was used. For Example 16 an oligomer with intrinsic viscosity of 0.144 dl/g was used. For Example 17 an oligomer of intrinsic viscosity 0.2 dl/g was used. Each was mixed at a level of 89.5 wt % with 0.5 wt % of the polycarbonate nucleating agent described in Example 12, and 10 wt % n-butyl stearate. The samples were prepared following the procedure described in Example 13. DSC thermograms were In each of these examples the presence of the polycarbonate nucleating agent resulted in an increase in crystallization rate beyond that expected for the combination of polycarbonate oligomer and plasticizer alone.

Examples #18–#24

A series of polycarbonate oligomer/polycarbonate nucleating agent/plasticizer mixtures were prepared using the methods described for Example 13. The polycarbonate nucleating agent was prepared using the method of Example 12. Butyl oleate (BO) was used as the plasticizer. All samples contained 0.5 wt % polycarbonate nucleating agent. The results are shown in Table 5.

TABLE 5

| Ex. # | wt % BO | PC IV (dl/g) | Tg (° C.) (1st heat) | $T^1_c$ (° C.), $\Delta H^1_c$ (J/g) (1st heat) | $T^1_m$ (° C.) $\Delta H^1_m$ (J/g) (1st heat) | $T^2_c$ (° C.), $\Delta H^2_c$ (J/g) (1st cool) | $T^2_m$ (° C.), $\Delta H^2_m$ (joules/g) (2nd heat) |
|---|---|---|---|---|---|---|---|
| 18 | 5 | 0.146 | 77.9 | 164.6, 19.3 | 217.6, 23.5 | 162.4, 23.5 | 217.6, 25.0 |
| 19 | 10 | 0.146 | 43.1 | 121.8, 29.0 | 216.8, 24.4 | 168.5, 26.7 | 217.2, 26.2 |
| 20 | 14.5 | 0.146 | 54.6 | 133.4, 26.8 | 216.7, 25.0 | 171.2, 24.3 | 216.6, 24.2 |
| 21 | 15 | 0.209 | 58.8 | 129.83, 25.7 | 220.3, 24.5 | 171.9, 25.0 | 215.8, 24.7 |
| 22 | 10 | 0.223 | nm | 151.5, 26.59 | 227.5, 14.9 | 163.3, 15.2 | 224.1, 17.1 |
| 23 | 15 | 0.223 | 61.5 | 133.9, 21.24 | 221.4, 21.4 | 171.9, 24.8 | 217.2, 22.8 |
| 24 | 12 | 0.155 | 53 | 122.6, 27.8 | 216.7, 22.9 | 171.1, 24.8 | 216.6, 25.8 | nm = not measured

In all cases the presence of the additives resulted in rapid crystallization.

Example 25

A large sample of composition identical to Ex. #24 was prepared by mixing the ingredients at room temperature. The mixture was used to feed a 16 mm Prism® twin screw extruder, using a general purpose screw configuration with a screw speed of 100 rpm. The extruder has five heated zones, four along the barrel (Z-1 to Z-4) and a fifth at the exit (Z-5). The temperatures of the zones were set to Z-1=15° C., Z-2=Z-3=215° C. and Z-4=218 and the exit heater Z-5=235° C. In this apparatus, the molten material exits through small cylindrical tip with outside diameter 51 mils and inside diameter 23 mils. The feed rate is adjusted so that the molten mixture flows as a series of drops (of approximate weight 20 mg). The drops fall onto a heated surface where they are held isothermally to crystallize. This is done using a rotating turntable. The turntable has a 12 inch flat steel surface which is heated to a desired temperature. The rotation of the turntable carries the particle to a point where it is removed. To minimize temperature variations, the rotating plate is covered be a second plate about one inch above it which is also heated. There is a small opening in the top plate to allow drops to reach the surface. The airgap between the tip and the rotating surface is very small, typically less than one inch, and is within the temperature controlled region. In this Example, the temperature of both plates was controlled at 120° C. The rotation rate was set to result in a residence time of 80 sec. The particles were initially clear (amorphous) but became opaque (crystalline) during the residence time. The particles were sufficiently hard after crystallization that they could be transported through a vacuum driven pick-up tube without deformation. The crystalline nature of the particles was confirmed by DSC. A crystallization peak was not observed during the first heat. A crystal melting transition occurred at 216.5° C. with a heat of fusion of 23.4 J/g. By comparing this data to the data for Example 24 we can see that essentially complete crystallization occurred on the turntable.

Example 26

The method described for Example 25 was used to prepare crystallized particles from a mixture consisting of 0.5 wt % polycarbonate nucleating agent prepared following Example 12, 10 wt % butyl oleate, and the remainder polycarbonate of intrinsic viscosity 0.146 dl/g. The extrusion conditions and particle collection conditions were the same as those used in Example 25. The DSC thermogram of these crystallized particles showed a melting temperature of 216.9° C. and a heat of fusion of 24.9 J/g.

The particles produced were solid state polymerized under flowing nitrogen (50 l/min) in a two inch diameter column at a particle temperature of 200° C. After an SSP time of 24.5 hours an intrinsic viscosity of 0.277 dl/g was found indicating that molecular weight growth had occurred.

Example 27

The particles described in Example 26 were solid state polymerized using a program consisting of a 2.5 hour segment at 170° C. with a nitrogen flow rate of 200 l/min followed by SSP at 200° C. for 22 hours. Intermediate samples were removed after 1, 3, and 5 hours at 200° C. In addition to measurement of intrinsic viscosity, the plasticizer content was measured using a method based on a ratio of peak areas in the C13 NMR spectrum recorded in deuterated methylene chloride. The starting material contained 10% butyl oleate plasticizer. The following results, shown in Table 6, demonstrate that both molecular weight growth and plasticizer removal occurred during solid state polymerization.

TABLE 6

| SSP Time at 200° C. (hours) | Intrinsic Viscosity (dl/g) | wt % butyl oleate |
| --- | --- | --- |
| 1.0 | 0.218 | 3.4 |
| 3.1 | 0.237 | 2.6 |
| 5.0 | 0.245 | 1.8 |
| 22.0 | 0.287 | not measurable |

What is claimed is:

1. A process for the preparation of crystalline polycarbonate oligomer compositions from amorphous polycarbonate oligomer compositions comprising the steps of a) preparing a mixture of the amorphous polycarbonate with at least one of:
  i) a fugitive crystallization enhancing agent
  ii) a high melting particulate polymeric nucleating agent b) forming this mixture in a shape desired, and c) crystallizing this mixture at a temperature above its glass transition temperature.

2. A process for the preparation of crystalline polycarbonate oligomer compositions from amorphous polycarbonate oligomer compositions comprising the steps of a) producing the oligomeric polycarbonate by contacting a bisphenol with a diaryl carbonate in the melt, in the presence of a suitable catalyst and contacting that mixture with i) a fugitive crystallization enhancing agent, and/or ii) a high melting particulate polymeric nucleating agent;

b) forming this mixture in a shape desired, and c) crystallizing this mixture at a temperature above its glass transition temperature.

3. The process as recited in claim 1 or claim 2 wherein the amorphous polycarbonate oligomer is mixed with a fugitive crystallization enhancing agent in the absence of a high melting polymeric nucleating agent.

4. The process as recited in claim 1 or claim 2 wherein the fugitive crystallization enhancing agent has a molecular weight between 150 g/mole and 600 g/mole.

5. The process as recited in claim 1 or claim 2 wherein the fugitive crystallization enhancing agent is selected from the group consisting of fatty acid esters, phthalates, mellitates, benzophenones and biphenyls.

6. The process as recited in claim 1 or claim 2 wherein the fugitive crystallization enhancing agent is present at 3–40 weight percent.

7. The process as recited in claim 1 or claim 2 wherein the fugitive crystallization enhancing agent is present at 5–30 weight percent.

8. The process as recited in claim 1 or claim 2 wherein the amorphous polycarbonate oligomer is mixed with a high melting polymeric nucleating agent in the absence of a fugitive crystallization enhancing agent.

9. The process as recited in claim 1 or claim 2 wherein the nucleating agent is prepared from a crystallized condensation polymer.

10. The process as recited in claim 8 wherein the nucleating agent is prepared from a crystallized polycarbonate oligomer.

11. The process as recited in claim 8 wherein the nucleating agent is prepared from a crystallized polyester.

12. The process as recited in claim 8 wherein the nucleating agent is prepared from a crystallized polyamide.

13. The process as recited in claim 1 or claim 2 wherein the nucleating agent consists of particles smaller than 50 mesh.

* * * * *